United States Patent [19]

Pennington

[11] Patent Number: 4,747,525
[45] Date of Patent: May 31, 1988

[54] PERIODIC RELEASE MECHANISM

[76] Inventor: Donald W. Pennington, 532 Woodstone Dr., Baton Rouge, La. 70808

[21] Appl. No.: 42,049

[22] Filed: Apr. 24, 1987

[51] Int. Cl.⁴ .......................... A01K 5/02; A01K 1/10
[52] U.S. Cl. .................................. 222/650; 119/51.11
[58] Field of Search ............... 222/161, 166, 650, 353, 222/638, 363, 364; 119/51.11, 51.12, 51.14, 51.15, 56 R

[56] References Cited

U.S. PATENT DOCUMENTS

| | | |
|---|---|---|
| 199,872 | 1/1878 | Sterzing . |
| 317,708 | 5/1885 | Bissell . |
| 983,919 | 2/1911 | McGuigan . |
| 1,409,434 | 3/1922 | Willman . |
| 2,538,413 | 1/1951 | Chard .................................. 161/10 |
| 2,538,421 | 1/1951 | Knarreborg ......................... 161/10 |
| 3,256,861 | 6/1966 | Giltner ............................. 119/51.11 |
| 3,295,500 | 1/1967 | Blough ............................... 119/51.5 |
| 3,754,527 | 8/1973 | Jenkins ........................... 119/56 R X |

*Primary Examiner*—H. Grant Skaggs
*Assistant Examiner*—Lisa C. Waag
*Attorney, Agent, or Firm*—Reginald F. Roberts, Jr.

[57] ABSTRACT

A mechanism which periodically releases a quantity of material stored in a container at predetermined intervals of time. The container is partially open and hollow, and is mounted pivotally on a first axle. The mechanism includes a counter-weight for the container. The counter-weight is sufficient to maintain the container in an upright position when empty but insufficient to maintain the container in the upright position when full. The mechanism further includes a catcher having first and second plates disposed perpendicularly or obiquely to one another. The first plate includes a closed notch near the center and an open notch at one edge of the first plate. The catcher is pivotally mounted on a second axle which passes through the closed notch. The mechanism further includes a stop member which extends from one side of the container. The stop member is disposed in the open notch of the catcher prior to release, and holds the container in an upright position until released. A rotating arm mounted on a third axle periodically contacts one face of the second plate, thereby releasing the catcher and causing the container to tip forward and discharge its contents.

6 Claims, 4 Drawing Sheets

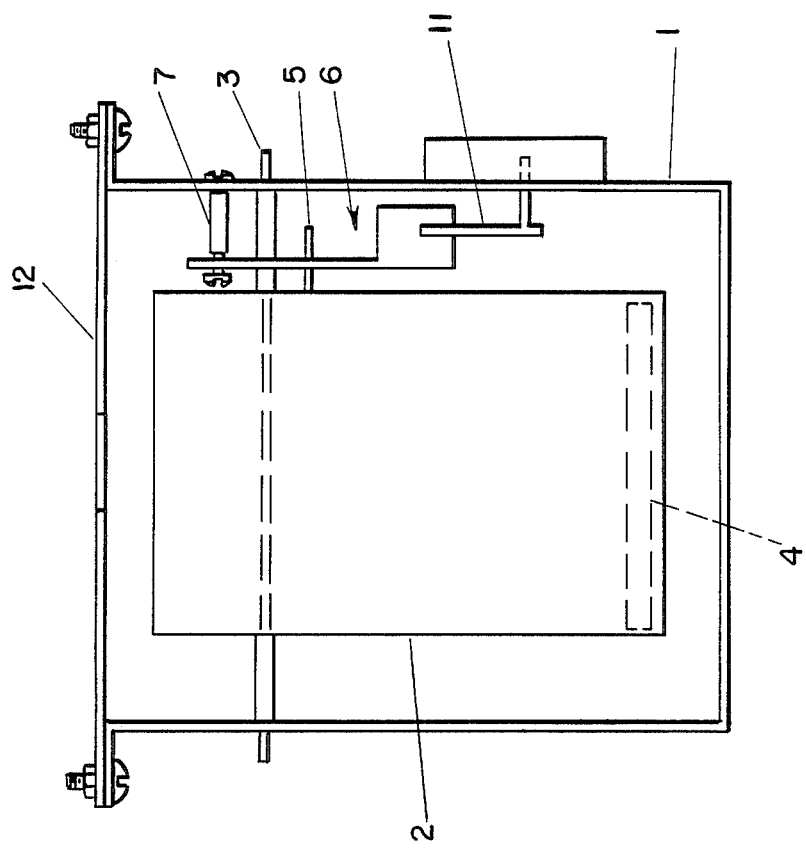

PERIODIC RELEASE MECHANISM

BACKGROUND OF THE INVENTION

The present invention relates to a release mechanism. More particularly, the invention relates to a mechanism which periodically releases a quantity of material stored in a container at predetermined intervals of time.

There are many feeders on the market that dispense feed automatically. These range from units that rely on the wind to dispense the feed to very large units that dispense variable amounts of feed at multi times, to feed at almost any time of the day or night. The following is a brief description of some of the feeders on the market at this time:

(1) Wind Feeder

This is a unit that comprises a five (5) gallon bucket with about a one (1) inch hole in the center of the bottom. Suspended in this hole is a top shaped metal piece (much like a toy top used by small boys). Attached to this top and suspended about twelve (12) inches below the bucket are two (2) flat metal sheets forming an "x". When the wind blows against the metal sheets, it rocks the top and lets a few grains of feed drop out of the bucket.

The major problem with this feeder is that when the wind blows too hard, the feeder will feed in excess; and when the wind does not blow, the feeder does not function.

(2) Flip Flop Feeder

This is a unit that has two small containers mounted 180 degrees from each other. There is a complex latching and releasing mechanism that is activated with a rotating concentric cam. When the cam releases the latch, the upper container (filled with feed and heavier than the empty lower container) will rotate to the lower position and dump the feed. At the same time the lower container will rotate to the upper position, latch, and be filled with feed for the next cycle. The latching and releasing mechanism is quite complex and must be kept clean of grains of feed.

(3) Electronic Feeders

There are numerous types of electronic feeders on the market. They all work on basically the same principle. An electronic timer that turns on an electric motor at the preset time. The shaft of the motor is attached to a flat plate mounted 90 degrees with respect to the motor shaft. This plate is mounted just below a hole in a hopper which contains the feed. When the motor spins, the feed on the plate is cast off by centrifugal force. The time the motor runs dictates the amount of feed dispensed.

(4) Solar Feeders

These feeders perform essentially the same function as the electronic feeders, except that the electric motor is activated by a solar cell which activates at sunrise and sunset.

U.S. Pat. No. 199,872 to Sterzing uses a modified alarm-clock to trip a lever f supporting the bottoms b of feed reservoirs a hung on a shaft c. A pin o on the alarm-wheel n strikes against a stud j' projecting from a rod j held in a notch k of a sliding bar h by a spring l. The pin o draws back the rod j to clear the notch k, releasing the bar h which in turn releases the lever f. The lever f is provided at one end with a spring-biased pawl e which supports the feed-reservoir bottoms b. The other end of the lever f is held fast by the sliding bar h until the trip mechanism releases the bar h, which then slides upward under the urging of a spring i. When the lower end of the bar h releases the other end of the lever f, the lever f and the pawl e are forced outward by a spring g, whereupon the support is withdrawn from the bottom b of the reservoir a, causing the bottoms to pivot downward and release the feed stored in the reservoirs a.

U.S. Pat. No. 317,708 to Bissell also uses an alarm-clock to trigger a release mechanism for a stock-feeder. The feeder comprises a funnel-shaped box A with a square chute A' having near its lower opening a trap-door B. The trap-door B is rigidly secured to a horizontal bar, and when closed is held in place by a trigger c pivoted to the outer surface of the chute A' in a U-shaped bearing c'. A trigger-rod b' is rigidly secured to the lower face of the trap-door B, and projects through a slot c" in one side of the chute A'. The trap-door B is sprung open by pressure against an arm d of the trigger c, thus freeing the trigger-rod b' and allowing it to fall through the slot c". The power necessary to operate the trigger c is supplied by an eccentric e affixed to a winging arbor or shaft e' of an alarm-clock E. At the time set for release of the trap-door B, the eccentric e presses against the arm d of the trigger c.

U.S. Pat. No. 983,919 to McGuigan also utilizes an alarm-clock as part of a trigger mechanism for releasing feed from a receptacle into a feed box. One end of a spring h is fastened to a side edge of a hopper b. By drawing back a chain p, the slide g is drawn back, and a spring h is stretched until the chain p is released. Upon release, the spring h expands and forces the slide g foward to close off further supply of feed from the hopper b until the parts are re-set. When the alarm goes off, a lever-arm u draws out of engagement with a hook w on one end of the chain p, and the weight of feed supported on the door m in the receptacle causes the door m to open and discharge the feed at the same time the slide g closes by the action of the spring h. To re-set the parts after release, the chain p is drawn back to re-engage the alarm-clock.

U.S. Pat. No. 1,409,434 provides a poultry-feeding device which comprises (a) a feed tank having a outlet, (b) a revolving drum beneath the outlet, (c) means for regulating the flow of feed from the outlet, (d) a motor which drives the drum, and (e) a brake which automatically stops the motor.

U.S. Pat. No. 2,538,413 discloses a release mechanism for an automatic poultry-feeder, whereby batches of feed of equal and predetermined amounts are automatically distributed at regular and controllable intervals, and from which no distribution of the feed occurs between these intervals.

With measuring receptacle 18 in the upright position shown in FIG. 1, a hopper is filled with dry feed. In this position, a valve-engaging member 31 of a measuring receptacle presses the outer end of the arm of a valve 15 against one side of the hopper, holding valve 15 open. The rear side of the receptacle rests against a bracket 23.

Since valve 15 is held open by the receptacle, feed from the hopper passes down through a discharging spout of the hopper until the level of feed in the receptacle reaches the spout, whereupon passage of feed ceases. The receptacle 18 is of such capacity as to hold just the proper amount for a single feeding.

An electric clock 29 is so set that at the desired feeding time a solenoid circuit is momentarily closed by timing control 29, which is so constructed that said circuit closing occurs periodically to the right, as viewed in FIGS. 1 and 2. This movement causes the upper end of lever-arm 25 to be pulled to the right while the bottom toothed end of lever-arm 25 moves in the opposite direction. This movement of lever-arm 25 tilts the filled receptacle 16 forward or to the left until the receptacle 16 becomes sufficiently over-balanced to continue tipping to the full discharging position illustrated in FIG. 2. The tipping movement of the receptacle 18 ceases when member 31 engages the top of feed-spreader cone 14. With receptacle 18 in this position, the measured amount of feed is quickly transferred from the receptacle to the floor or ground. As receptacle 18 tips from the upright position of FIG. 1 to the discharging position of FIG. 2, valve 15 is no longer held open by member 31, and this valve swings to the closed position and thereby prevents further passage of feed from the discharge spout of the hopper. Closing of the valve 15 is not interfered with by the tipping of receptacle 18, since a notch 24 in the receptacle allows for complete clearance of the valve. As soon as receptacle 18 is empty, counter-weight 21 causes the receptacle to swing back to the upright position; while lever-arm 25, plunger rod 28', and connecting linkage return to their original positions. As receptacle 18 swings back to its upright position, member 31 contacts the outer end of the arm of valve 15, thereby overcoming the slight over-balancing of the valve arm, and opening the valve and holding it open as long as the receptacle remains in the upright position. The measuring receptacle is again quickly filled with feed from the hopper, and the device remains inactive until the clock 29 again causes the solenoid to become engaged. The cycle is then repeated.

U.S. Pat. No. 2,538,421 to Knarreborg describes a release mechanism for feeding apparatus. The release mechanism is, like the mechanisms disclosed in U.S. Pat. Nos. 199,872, 317,708, and 983,919, activated by an alarm-clock is substantially the same way as the earlier patents. The patent for Knarreborg, however, additionally provides a mechanism for delaying a second alarm for a time at least equal to the adjustment period of the alarm-clock.

U.S. Pat. No. 3,295,500 to Blough describes an automatic feed-weighing apparatus for livestock. As shown in FIG. 1, the apparatus 10 includes a bin 11 for storing bulk quantities of dry feed. From the bin 11, the feed is distributed through a conveyor 12 which passes over a plurality of live-stock feeding stations indicated generally at S.

The conveyor 12 is driven by a motor 13 which is intermittently energized through an automatic-timing clock 14 adaptable to operate the conveying mechanism at a preselected intervals.

Adjacent each feeding station S the conveyor 12 supports a weighing unit 16 adaptable to weighing and depositing a controlled portion of feed. Each of the weighing units 16 automatically trips when a controlled portion of feed has been received. After the last unit trips, the cycle is complete, and a switch to the time clock automatically opens to de-energize the motor circuit.

SUMMARY OF THE INVENTION

In general, the present invention provides a periodic release mechanism for the discharging of material from a partially open, hollow container pivotally mounted on a first axle. The mechanism comprises a counter-weight for the container, which counter-weight is sufficient to maintain the container in an upright position when the container is empty, but is insufficient to maintain the container in an upright position when the container is filled with material.

The mechanism further comprises a catcher which includes first and second plates disposed perpendicularly or obliquely to one another. The first plate includes a closed notch near the center, and an open notch at one edge of the first plate. The catcher is pivotally mounted on a second axle which passes through the closed notch. The mechanism further comprises a stop member which extends from one side of the container. The stop member is disposed in the open notch of the catcher prior to release, and holds the container in an upright position until release. The mechanism further comprises a rotating arm mounted on a third axle. The rotation of the arm defines a circle. The motion of the arm is further characterized as periodic and cyclic. At least one end of the arm periodically contacts one face of the second plate of the catcher.

After the container has been filled with material, and before the container has been released, the second axle is disposed at the upper end of the closed notch, and the stop member is disposed in the lower end of the open notch.

When the rotating arm contacts the face of the second plate, the catcher is tilted in the direction of the motion of the rotating arm. The second axle remains at the upper end of the closed notch. When the catcher has been tilted sufficiently to dispose the stop member out of the open notch, the stop member moves downward and in a direction opposite to that of the rotating arm, the motion of the stop member thereby defining an arc. The arc lies outside the periphery of the first plate of the catcher below the open notch, and within the periphery of the upper edge of the open notch. The container tips forward and discharges the material container therein.

After the material has been discharged from the container, the counter-weight restores the container to its upright position. The stop member retraces the arc previously defined, and in so doing strikes the leading upper edge of the open notch and restores the catcher to its original position, with the second axle at the lower end of the closed notch, thereby disposing the second plate on the side of the rotating arm opposite to that on which the second plate was originally disposed.

After the container has been filled with material, and before the container has again been released, the second axle is disposed at the upper end of the closed notch, and the stop member is disposed in the lower end of the open notch, thereby completing a cycle.

The most important feature of the invention is the release mechanism, which includes the catcher, stop member, and rotating arm. The geometry and relative dimensions are critical, viz.;

(1) The distance defined by the vertical movement of the catcher must be greater than the vertical overlap of the end of the rotating arm and the lower edge of the second plate.

(2) The rotating arm, at its point of contact with the face of the second plate, must be narrower than the horizontal distance from the leading edge of the end of the rotating arm, to the lower edge of the second plate, when the second axle is in the lower region of the closed notch, and the stop member in contact with the upper edge of the open notch against the lateral edge of the open notch.

(3) The point of contact between the stop member and the leading upper edge of the open notch, as the stop member retraces its arc of descent, must lie between the second axle and the notched edge of the first plate.

(4) the arc defined by the movement of the stop member, as it retraces its arc of descent, must lie outside the periphery of the lower edge of the open notch, and within the periphery of the upper edge of the open notch.

BRIEF DESCRIPTION OF THE DRAWINGS

FIG. 1 is a front view, partly schematic, of apparatus made in accordance with the principles of the present invention.

DESCRIPTION OF THE PREFERRED EMBODIMENT

Figure 2A:
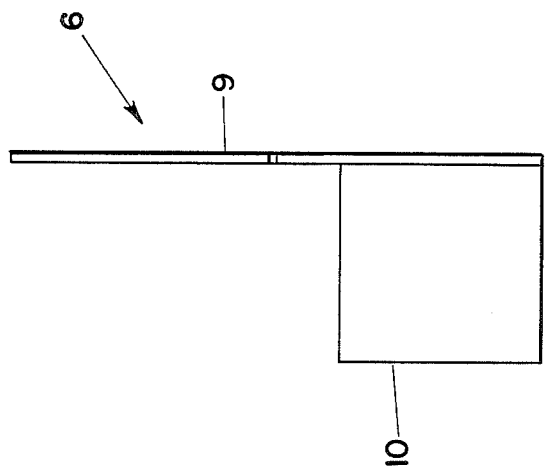
FIG. 2a is a view of the catcher as seen from the right in FIG. 1.
Figure 2B:
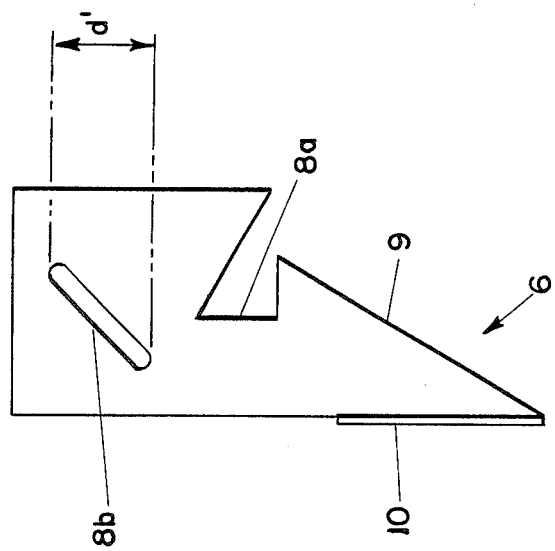
FIG. 2b is a view of the catcher as seen from the rear in FIG. 1.

The invention provides a mechanism for the periodic release of stored material as, e.g., the periodic feeding of animals such as deer and other game. The apparatus shown in FIG. 1 comprises, for example, a U-shaped bracket or frame 1 in which is disposed a hollow container 2 mounted on a pivot axle 3, and provided with a counter weight 4 such as a metal bar. A wire stop 5 extending from one side of the container 2 is disposed in an open notch 8a, of the catcher 6 shown in FIG. 3.

The catcher 6 is pivotally suspended from a spacer 7 fastened to one side of the U-bracket 1 by a closed notch 8b in the first plate 9 of the catcher.

Figure 3:
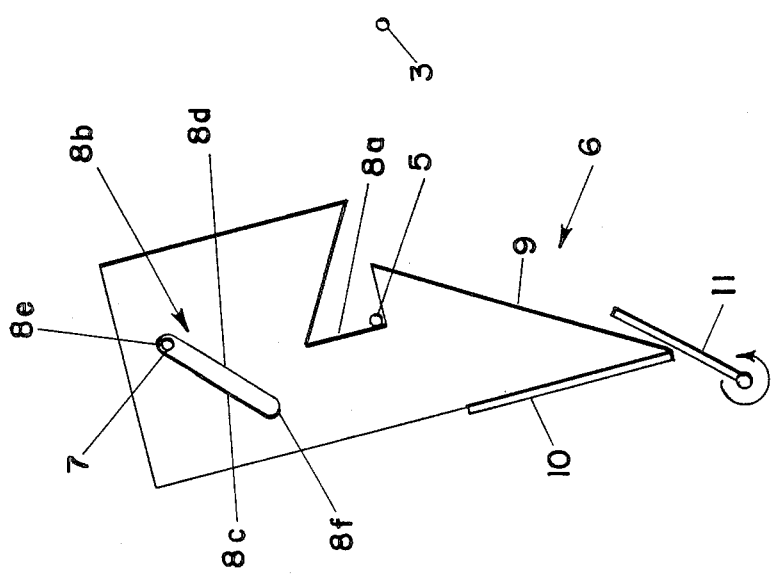
FIG. 3 is a schematic representation of the relationship between the catcher, the pivot axle, the spacer, the wire stop, and the clock hand at the beginning of a cycle.
Figure 6:
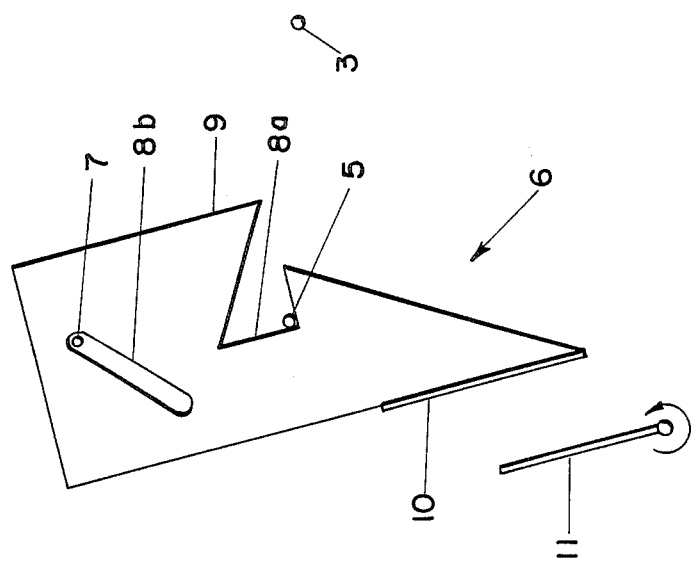
FIG. 6 is a schematic representation of the relationship between the catcher, the pivot axle, the spacer, the wire stop, and the clock hand at the point in time that the container has been refilled and the catcher returned to its original position.

The closed notch 8b may be circular, square, rectangular, ellipsoidal, or any regular shape. Preferably, however, as shown in FIG. 3, the closed notch 8b comprises first and second sides, 8c and 8d, which are substantially parallel, and equal in length. The third and fourth sides 8e and 8f, are also substantially parallel and are substantially shorter in length than the first and second sides. The first and second sides 8c and 8d define an axis of the closed notch 8b, as shown in FIG. 3.

The second plate 10, which extends perpendicularly or obliquely from the first plate 9, is periodically contacted by a rotating clock hand 11, which tips the catcher 6 and releases the container 2, thereby allowing and causing the container 2 to tip and discharge grain or other feed which has accumulated therein, since the weight of the feed is greater than the counter-weight 4. The container 2 is filled by gravity force and through a hole in the bottom of a hopper (not shown) disposed above and mounted on a back-up plate 12, shown in FIG. 1, having a hole in its center. When the container 2 has been completely filled, flow from the hopper to the container 2 is automatically stopped by blockage by the feed in the filled container 2.

Figure 4:
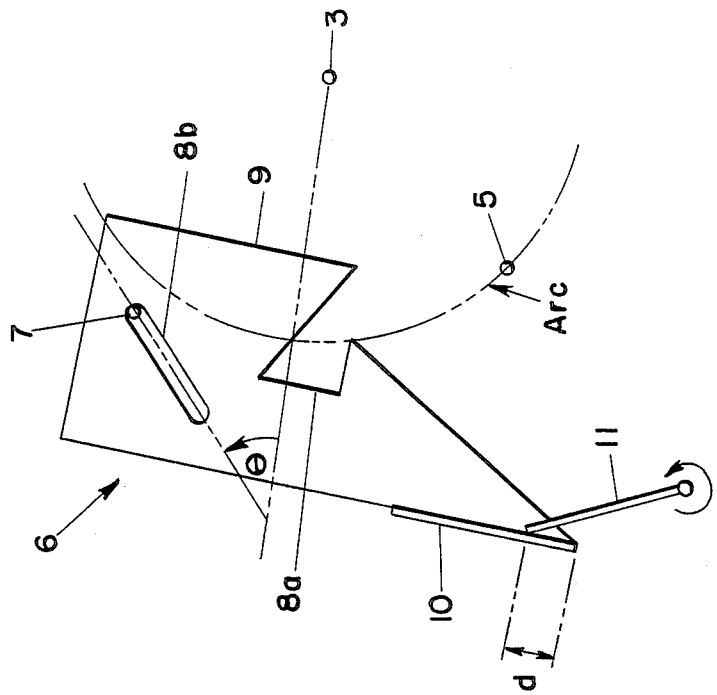
FIG. 4 is a schematic representation of the relationship between the catcher, the pivot axle, the spacer, the wire stop, and the clock hand at the point in time that the wire stop is released.

The most important feature of the invention is the release mechanism, which includes the catcher 6, the wire stop 5, and the clock hand 11. The geometry and relative dimensions are critical, viz.:

(1) The distance d is defined in FIG. 4 as the vertical overlap of the clock hand 11 and the bottom edge of the second plate 10. The distance d' is defined in FIG. 2a as the projection onto a vertical plane of the closed notch 8b. The distance d' must be larger than the distance d.

(2) The point of contact between the wire stop 5 and the leading upper edge of the open notch 8a, as the wire stop 5 retraces its arc of descent, must lie between the the second axle 7 and the edge of the first plate 9, as viewed in FIG. 4.

(3) The arc defined by the movement of the wire stop 5 must lie outside the periphery of the lower edge of the open notch 8a, and within the periphery of the upper edge of the open notch 8a, as shown in FIG. 4.

Figure 5:
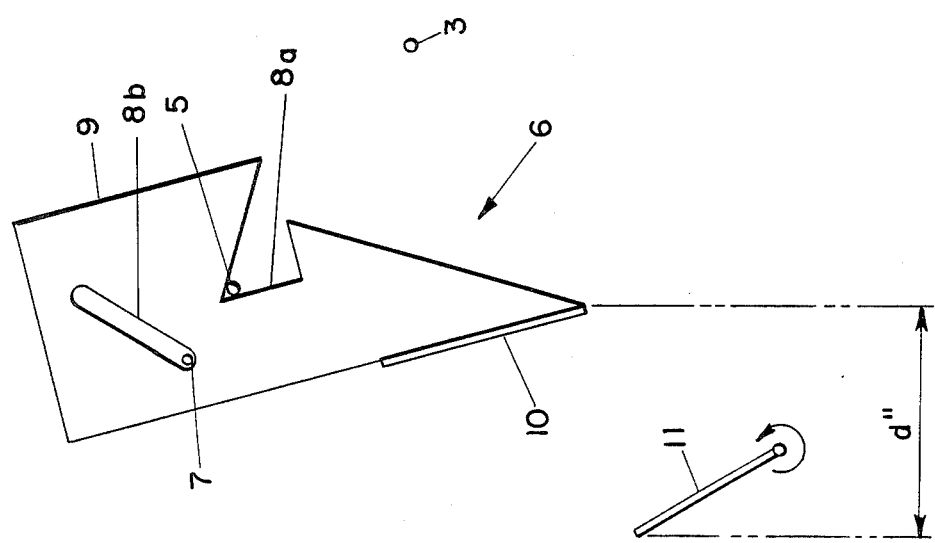
FIG. 5 is a schematic representation of the relationship between the catcher, the pivot axle, the spacer, the wire stop, and the clock hand at the point in time that the wire stop, having retraced its arc of descent, lifts the catcher above and to the right of the clock hand.

(4) The width of the clock hand 11, at its point of contact with the second plate 10, must be less than the horizontal distance d", shown in FIG. 5, from the leading edge of the clock hand 11 at its tip, to the lower edge of the second plate 10, which is closer to the open notch 8a, when the spacer 7 is in the lower end of the closed notch 8b and the wire stop 5 is on the upper edge of the open notch 8a against the lateral edge of the open notch 8a as shown in FIG. 5.

(5) The angle $\theta$ is defined in FIG. 4 as the angle which the axis of the closed notch 8b makes with a line through the center of the pivot axle 3 and the point of contact which the wire stop 5 makes with the upper leading edge of the open notch 8a as it retraces its arc of descent. The magnitude of the angle $\theta$ is from about 20 degrees to about 160 degrees. Preferably, the magnitude of the angle $\theta$ is from about 80 degrees to about 100 degrees; more preferably the magnitude of the angle $\theta$ is from about 35 degrees to about 55 degrees. The nearer the angle $\theta$ approaches zero or 180 degrees, the more difficult becomes the functioning of the invention.

The reasons for these limitations will be apparent from the following description which, in combination with FIGS. 3-6, illustrates the operation and use of the release mechanism.

When and after the container 2 has been filled with animal feed, it tips forward by pivoting on the pivot axle 3, and the configuration of pivot axle 3, wire stop 5, catcher 6, spacer 7, and clock hand 11 is as shown in Figure 3. Note that the spacer 7 is at the top end of the closed notch 8b, and that the wire stop 5 is resting on the bottom edge of the open notch 8a.

As the clock hand 11 moves in the direction indicated, it trips the release mechanism by contacting the face of the second plate 10, and the configuration changes to that shown in FIG. 4. Note that the spacer 7 is still in the same position, but that the wire stop 5 has moved downward and to the right of the spacer 7, as viewed in FIG. 4. At the same time, the catcher 6 has been tilted to the left of the position shown in FIG. 3. After the container 2 has discharged the feed, the counter-weight 4 causes the container 2 to swing upward and retrace its arc of descent. As it does so, the attached wire stop 5 strikes the leading upper edge of the open notch 8a and lifts the catcher 6, thereby moving the spacer 7 to the bottom of the closed notch 8b, as shown in FIG. 5, very importantly and critically, with the second plate 10 now on the opposite side of the clock hand 11. As soon as the container 2 fills with feed, the entire assembly returns to the configuration shown in FIG. 6, with the second plate 10 now on the opposite side of the clock hand 11.

The critical feature of the invention is the mechanism just described by which the catcher is moved from one side of the clock hand 11 to the other side of the clock hand 11, thereby renewing the feed cycle. It will be appreciated that, the motion of the clock hand 11 is very slow relative to that of the release container 2 and wire stop 5. Hence, in the absence of such a displacement mechanism, the clock hand 11 would obstruct the repositioning of the catcher 6, since for practical purposes the hand 1 would not have moved from its "trip" position. It will now be apparent that the release mechanism will displace the catcher 6 to the opposite side of the clock hand 11 if, and only if, the distance d' shown in FIG. 2a is greater than the distance d shown in FIG. 4. It will also be clear why the arc, shown in FIG. 4, traced by the wire stop 5, must lie in the region of space defined hereinabove, since otherwise the returning wire stop 5 would not engage the open notch 8a.

An angle $\theta$ is defined in FIG. 4 as the angle which the axis of the closed notch 8b makes with a line through the center of the pivot axle 3 and the point of contact which the wire stop 5 makes the upper leading edge of 25 the open notch 8a.

I claim:

1. A periodic release mechanism for discharging material from a partially-open, hollow container pivotally mounted on a first axle, comprising:
   (a) a counter-weight for the container, which counter-weight is sufficient to maintain the container in an upright position when the container is empty, but is insufficient to maintain the container in an upright position when the container is filled with material;
   (b) a catcher including first and second plates disposed at an angle to one another, the first plate including a closed notch near the center and an open notch at one edge of the first plate, the catcher pivotally mounted on a second axle passing through the closed notch;
   (c) a stop member extending from one side of the container, the stop member disposed in the open notch of the catcher, for holding the container in an upright position until release; and
   (d) a rotating arm mounted on a third axle, the rotation of the arm defining a circle, the motion of the arm characterized as periodic and cyclic, the rotating arm making periodic contact with one face of the second plate of the catcher so as to pivot the catcher and release the stop member from the open notch, thereby emptying the contents of the container.

2. The release mechanism of claim 1, wherein the geometry of the release mechanism is defined by the following conditions:
   (a) the distance defined by the vertical movement of the catcher must be greater than the vertical overlap of the end of the rotating arm and the lower edge of the second plate;
   (b) the rotating arm, at its point of contact with the face of the second plate, must be narrower than the horizontal distance from the leading edge of the rotating arm, to the lower leading edge of the second plate, when the second axle is in the lower region of the closed notch, and the stop member is in contact with the upper edge of the open notch against the lateral edge of the open notch;
   (c) the point of contact between the stop member and the leading upper edge of the open notch, as the stop member retraces its arc of descent, must lie between the second axle and the notched edge of the first plate; and
   (d) the arc defined by the movement of the stop member must lie outside the periphery of the lower edge of the open notch, and within the periphery of the upper edge of the open notch.

3. The release mechanism of claim 2, wherein the closed notch is substantially rectangular.

4. The release mechanism of claim 3, wherein (e) the axis of the closed notch and (f) a line through the second axle and the point of contact which the stop member makes with the upper leading edge of the open notch define an angle therebetween of from about 20 degrees to about 160 degrees.

5. The release mechanism of claim 3, wherein (e) the axis of the closed notch and (f) a line through the second axle and the point of contact the stop member makes with the upper leading edge of the open notch define an angle therebetween of from about 80 degrees to about 100 degrees.

6. The release mechanism of claim 3, wherein (e) the axis of the closed notch and a (f) line through the second axle and the point of contact the stop member makes with the upper leading edge of the open notch define an angle therebetween of from about 35 degrees to about 55 degrees.

* * * * *